(12) United States Patent
Imamura

(10) Patent No.: US 7,558,896 B2
(45) Date of Patent: Jul. 7, 2009

(54) DATA TRANSFER CONTROL DEVICE ARBITRATING DATA TRANSFER AMONG A PLURALITY OF BUS MASTERS

(75) Inventor: Kenji Imamura, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 222 days.

(21) Appl. No.: 11/642,643

(22) Filed: Dec. 21, 2006

(65) Prior Publication Data

US 2007/0276974 A1    Nov. 29, 2007

(30) Foreign Application Priority Data

May 23, 2006    (JP)    ............... 2006-142760

(51) Int. Cl.
    *G06F 13/36* (2006.01)
(52) U.S. Cl. ...................... 710/116; 710/241
(58) Field of Classification Search ............. 710/40–41, 710/109–112, 309, 240–244, 113–119
    See application file for complete search history.

(56) References Cited

U.S. PATENT DOCUMENTS

| | | | | | |
|---|---|---|---|---|---|
| 5,862,355 | A | * | 1/1999 | Logsdon | 710/116 |
| 6,473,817 | B1 | * | 10/2002 | Jeddeloh | 710/113 |
| 6,810,456 | B2 | * | 10/2004 | Kim | 710/240 |
| 7,051,133 | B2 | * | 5/2006 | Takata | 710/111 |
| 7,080,176 | B2 | * | 7/2006 | Matsushita et al. | 710/123 |
| 7,127,540 | B2 | * | 10/2006 | Lee | 710/243 |
| 7,206,869 | B2 | * | 4/2007 | Shishizuka et al. | 710/20 |
| 2007/0011381 | A1 | * | 1/2007 | Ishida | 710/116 |
| 2007/0130410 | A1 | * | 6/2007 | Keller et al. | 710/310 |

FOREIGN PATENT DOCUMENTS

| | | |
|---|---|---|
| JP | A 08-314852 | 11/1996 |
| JP | A 10-027156 | 1/1998 |
| JP | A 2000-259556 | 9/2000 |
| JP | A 2001-084219 | 3/2001 |

* cited by examiner

*Primary Examiner*—Raymond N Phan
(74) *Attorney, Agent, or Firm*—Oliff & Berridge, PLC

(57) ABSTRACT

According to an aspect of the invention, there is provided a data transfer control device that carries out data transfer in a data transfer system, in which plural bus masters are connected to a system bus and the data transfer between the bus masters is arbitrated by bus arbitration of each of the bus masters, between the bus masters, the data transfer control device including: an execution cycle monitoring section that monitors an access state for the system bus at the bus master when plural bus masters simultaneously request a use right with respect to the system bus; and a function execution order changing control section that changes an execution order of plural functions included in the bus master to be monitored, based on the access state monitored by the execution cycle monitoring section.

13 Claims, 5 Drawing Sheets

CYCLE DIRECTION

CYCLE DIRECTION

CYCLE DIRECTION

DATA TRANSFER CONTROL DEVICE ARBITRATING DATA TRANSFER AMONG A PLURALITY OF BUS MASTERS

BACKGROUND

1. Technical Field

The present invention relates to a data transfer control device which performs data transfer by making an access request from a bus master to another bus master, in a data transfer system in which the plural bus masters are connected to a system bus and the data transfer is arbitrated among the bus masters by bus arbitration of each bus master.

2. Related Art

Conventionally, data transfer is performed among masters when the plural masters structured by a processor, a memory, input and output devices, and the like are accessibly connected to one another through a system bus.

In such a system, because requests of bus use right (hereinafter referred to as "bus right") are expected to be simultaneously made from the plural masters, the bus right is arbitrated by a bus arbiter.

A fixed priority scheme and a round robin scheme are typical example of bus arbitration performed by the bus arbiter.

In the fixed priority scheme, the priority of the master to which the bus right is given is previously determined when the plural masters simultaneously make the bus right requests, and the master having the higher priority always obtains the bus right.

In this case, when the master having the higher priority continuously occupies the bus, the master having the lower priority (such as the input and output devices) cannot obtain the bus right for a long time, which eventually generates time-out in the master having the lower priority.

On the other hand, the round robin scheme is one in which the order of the master to which the bus right is given next is changed when the plural masters simultaneously make the bus right requests.

In either the fixed priority scheme or the round robin scheme, or in the combined use of the fixed priority scheme and the round robin scheme, the master having the lower priority hardly obtains the bus right when the bus transfer becomes excessively concentrated. That is, in the master having the lower priority, the possibility that the bus right is not obtained is increased in the fixed priority scheme, and there is no guarantee of performance although the order of the bus right comes in the round robin scheme. Furthermore, in either the fixed priority scheme or the round robin scheme, there is also a possibility that deadlock (abnormal stop of system) is locally generated due to the excessively concentrated bus transfer.

For example, in a case where a main CPU and a main memory are connected to the bus through multi-stage arbiters (arbiter 1 and arbiter 2), the deadlock is possibly generated in the following conditions. That is, (1) data writing from the main CPU to an external I/O (through the arbiter 2), (2) data reading from the main memory to an external DMA master 1 (through the arbiter 1 and the arbiter 2), and (3) data writing from the external DMA master 2 to the main memory (through the arbiter 2, and the arbiter 1) are continuously performed.

In this case mentioned above, performance of (1)→performance of (2)→retry of (3)→performance of (1)→performance of (2)→retry of (3)→ . . . is performed by the arbitration, so that performance of (3) is blocked (is not performed) for a long time.

This is because the arbitration is performed in the multi stages, and the trouble that the performance of (3) is blocked for a long time might always be generated under the condition that the arbitration of the main memory is operated independently of the arbitration of the external masters (DMA masters 1 and 2).

In the techniques, the operation is performed based on the particular bus arbitration, and the priorities are irregularly changed by deviation from the basic bus arbitration rule when some sort of condition holds. Therefore, a configuration of a control circuit for irregularly changing the priorities becomes complicated.

Furthermore, in the techniques, the circuit configuration is required for the dedicated bus arbitration, and the circuit configuration for the already-existing bus arbitration cannot directly be applied.

SUMMARY

According to an aspect of the invention, there is provided a data transfer control device that carries out data transfer in a data transfer system, in which plural bus masters are connected to a system bus and the data transfer between the bus masters is arbitrated by bus arbitration of each of the bus masters, between the bus masters, the data transfer control device including: an execution cycle monitoring section that monitors an access state for the system bus at the bus master when plural bus masters simultaneously request a use right with respect to the system bus; and a function execution order changing control section that changes an execution order of plural functions included in the bus master to be monitored, based on the access state monitored by the execution cycle monitoring section.

BRIEF DESCRIPTION OF THE DRAWINGS

Exemplary embodiments of the invention will be described in detail with reference to the following drawings, wherein.

DETAILED DESCRIPTION

Figure 1:
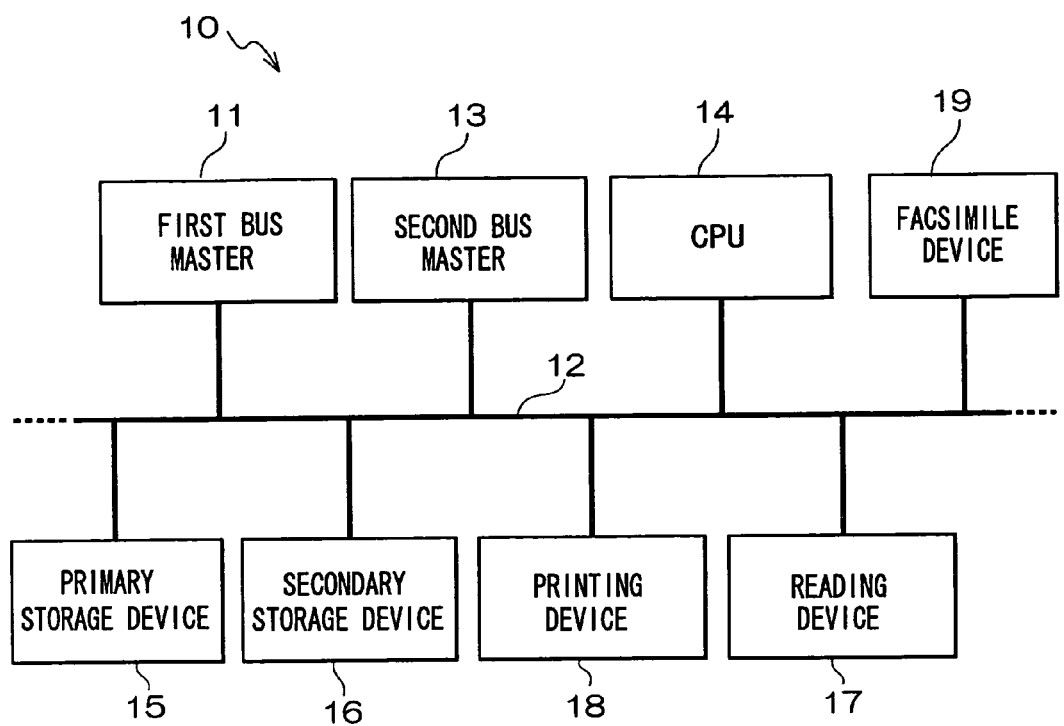
FIG. 1 is a block diagram showing a network system according to an exemplary embodiment.

FIG. 1 shows a device system 10 according to an exemplary embodiment of the invention.

A first bus master 11, a second bus master 13, CPU 14, a primary storage device 15, a secondary storage device 16, a printing device 18, a reading device 17, and a facsimile device 19 (and the like) are connected to a system bus 12 in the device system 10, and a signal (data signal, control signal) can be exchanged therebetween.

The CPU 14 performs editing, processing and computing information (such as image data).

The pieces of information in which the edit and the like are performed by the CPU 14 are collectively stored and managed in the secondary storage device 16. The information stored in the secondary storage device 16 can be shared with respect to the information obtaining request from the CPU 14.

The information is transmitted to the printing device 18, and the printing device 18 performs a print process to a predetermined recording sheet by a driver previously installed in CPU 14.

In the reading device 17, scanning is performed by placing an original on an original plate provided in an upper portion of the reading device 17 (for example, in a case of "multi-copier"). A CCD sensor reads an original image to generate digital image data by the scanning. The digital image data is transmitted to CPU 14 which makes the scanning request, the previously assigned CPU 14, or the secondary storage device 16.

In the printing device 18, the digital image data read by the reading device 17 is directly transmitted to a printer function to be able to print the same image as the original image in the predetermined recording sheet.

The facsimile device 19 performs transmission and reception of data through public telephone line. The facsimile device 19 transmits the image read by the reading device 17, and the image received by the facsimile device 19 is printed in the predetermined recording sheet with the printing device 18.

In the device system 10 having the above-described configuration, the first bus master 11, the second bus master 13, CPU 14, the primary storage device 15, the secondary storage device 16, the printing device 18, the reading device 17, and the facsimile device 19 each makes request of the use right with respect to the bus 12, so that sometimes the requests of use right are concentrated in the same period.

The arbitration function is provided in each device to perform arbitration to the use request of bus 12 by the arbitration function, the order of the use right is set so as to assign the use right of the bus 12 in non-uniform manner. (The case with the CPU 14, the secondary storage device 16, and the printing device 18 will be described below by way of example.)

Even though the arbitration is performed by the arbitration function, the bus master to which the use right is not given for a long time exists because the priority is basically determined, and the deadlock is generated in this bus master because the state in which the use right is not given continues for a long time. Particularly, when the use right of the bus is not given to one function of the plural functions of the printing device 18, the trouble that other functions cannot be performed is generated.

Therefore, a deadlock monitoring unit 20 (see FIG. 2) is provided in the printing device 18 of the exemplary embodiment of the invention. The deadlock monitoring unit 20 monitors a state of the request of the use right of the bus 12, and give the priority to another function by passing through the function in which the use right is not obtained.

Figure 2:
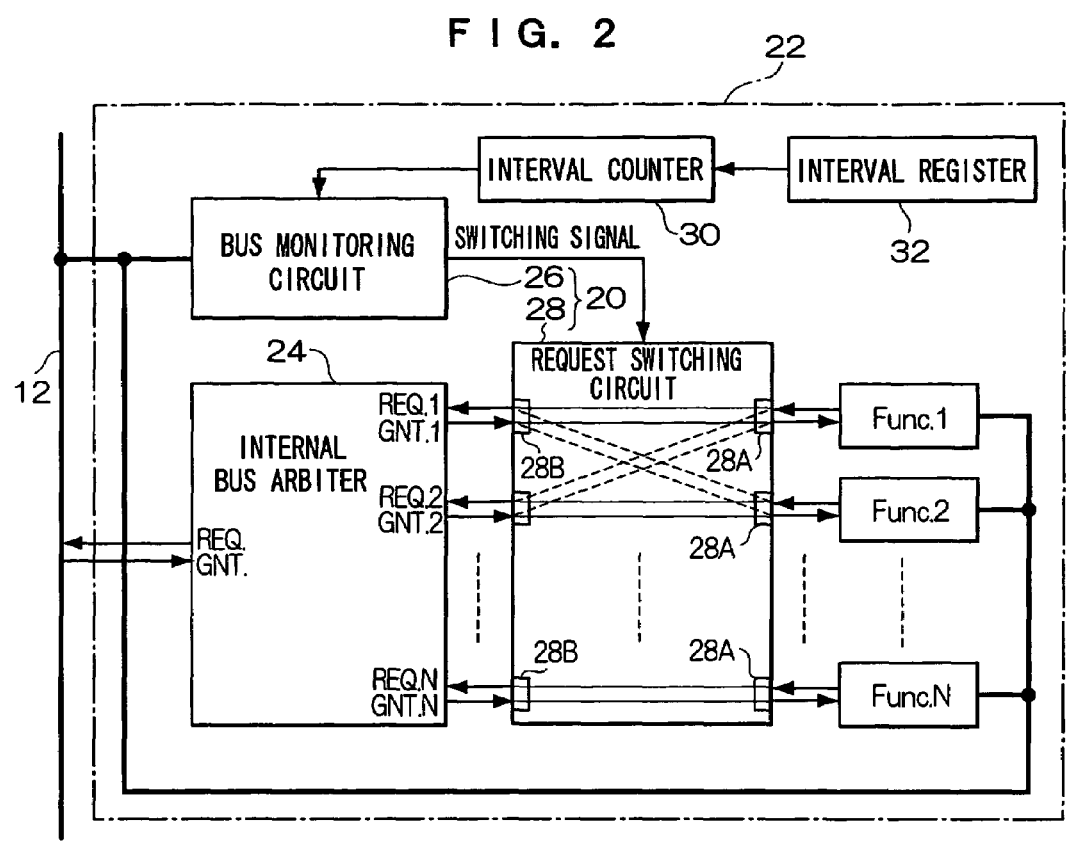
FIG. 2 is a block diagram showing a data transfer control circuit in a bus master according to the exemplary embodiment.

FIG. 2 schematically shows a data transfer control circuit 22 of the printing device 18, in which the deadlock monitoring unit 20 is provided. Referring to FIG. 2, the deadlock monitoring unit 20 includes a bus monitoring circuit 26 and a request switching circuit 28.

An internal bus arbiter 24 which controls the arbitration function is connected to the bus 12. The bus monitoring circuit 26 which constitutes a part of the deadlock monitoring unit 20 is connected to the bus 12.

The internal bus arbiter 24 outputs, between the bus 12, execute request signals of plural functions (expressed by Func. 1, Func. 2, . . . , and Func. N in FIG. 2) which the printing device 18 includes, and reply signals with respect to the requests are inputted to the internal bus arbiter 24.

The request switching circuit 28 which constitutes the deadlock monitoring unit 20 together with the bus monitoring circuit 26 is placed between the internal bus arbiter 24 and the Func. 1, Func. 2, . . . , and Func. N.

The request switching circuit 28 and the bus monitoring circuit 26 are directly connected to each other. The bus monitoring circuit 26 sends a signal (switching signal) to the request switching circuit 28 when predetermined condition is satisfied in the bus monitoring circuit 26.

An interval counter 30 is connected to the bus monitoring circuit 26. An interval register 32 is connected to the interval counter 30.

A predetermined interval (period) is set to the interval register 32, and the bus monitoring circuit 26 is started up in each time when a count value counted by the interval counter 30 reaches the predetermined interval. The bus monitoring circuit 26 monitors whether the request of the use right of the bus 12 is normally finished within a predetermined count (predetermined period) or retry (re-request) is requested.

The bus monitoring circuit 26 counts the number of times of the retry requested, and outputs the switching signal when the number of retry requests reaches predetermined times within the predetermined period.

On the other hand, N internal connection terminals 28A corresponding to the functions (Func. 1, Func. 2, . . . , and Func. N) are provided in the request switching circuit 28, and the signals are transmitted and received to and from the Func. 1, Func. 2, . . . , and Func. N through the internal connection terminals 28A respectively.

N external connection terminals 28B connected to the internal bus arbiter 24 are also provided in the request switching circuit 28.

Figure 3A:
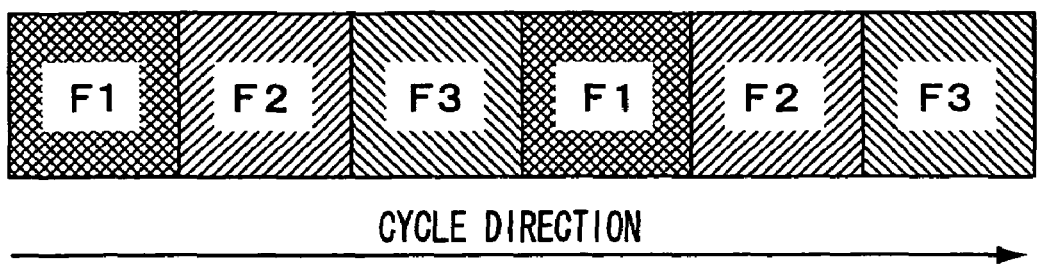
FIGS. 3A to 3C are cycle conceptual views, FIG. 3A showing a switching pattern performed by an internal bus arbiter in a steady state, FIG. 3B showing a switching pattern 1 performed by a request switching circuit when retries are generated predetermined times in a predetermined period, and FIG. 3C showing a switching pattern 2 performed by the request switching circuit when the retries are generated predetermined times in a predetermined period.

In the request switching circuit 28, the internal connection terminals 28A and the external connection terminals 28B can be connected to each other. In the steady state (the retry is hardly generated and each function is performed at a predetermined cycle), the connection relationship between the internal connection terminal 28A and the external connection terminal 28B is fixed in the request switching circuit 28 (see FIG. 3A). When the switching signal is inputted from the bus monitoring circuit 26, the connection relationship between the internal connection terminal 28A and the external connection terminal 28B is changed based on a previously set switching pattern (see FIG. 3B or 3C, the detail thereof will be described later).

In other words, the connection is established to another function different from the function recognized by the internal bus arbiter 24.

The above mentioned two kinds of switching patterns can be explained below as typical representatives.

(1) One-Time Order Changing Switching Pattern in Cycle

Figure 3B:
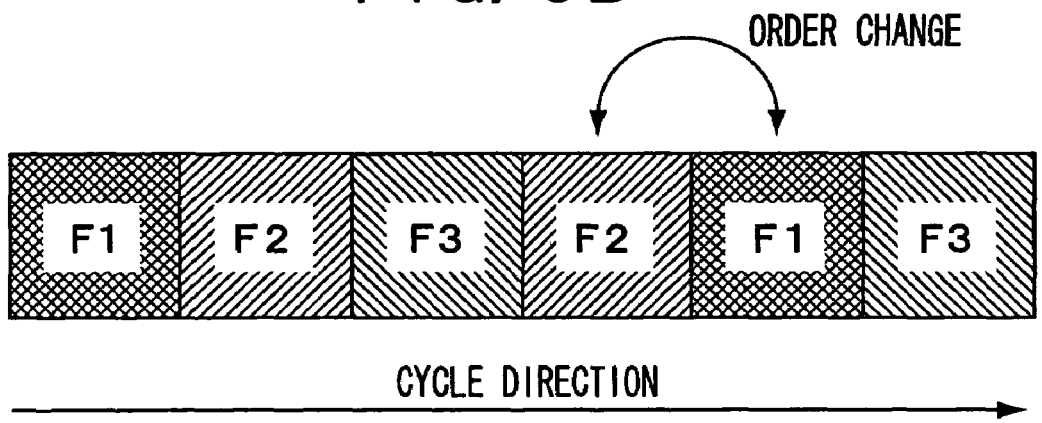

As shown in FIG. 3B, for example, in the case of the three kinds of functions (F1, F2, and F3), the one-time order changing switching pattern is a switching pattern in which the function F1 and the function F2 are replaced each other in a particular cycle with respect to the cycle (F1→F2→F3→F1→ . . . ) in the normal state.

That is, the function F2 is executed in advance in a point in which the function F1 is allocated. At this point, the internal bus arbiter 24 does not recognize this fact.

(2) Continuous Execution Switching Pattern

In the continuous execution switching pattern, a point in which the function F2 is allocated is, what is called, taken away by the function F1, and the function F2 is not permitted to use the bus 12 till the next arbitration. Therefore, the function F2 is skipped to the next arbitration. At this point, the internal bus arbiter 24 does not recognize this fact.

The deadlock which may be possibly generated by continuing the steady state is eliminated by one of the above mentioned switching patterns. Because the internal bus arbiter 24 does not recognize the fact as described above, the already-existing data transfer control system can be utilized.

Figure 4:
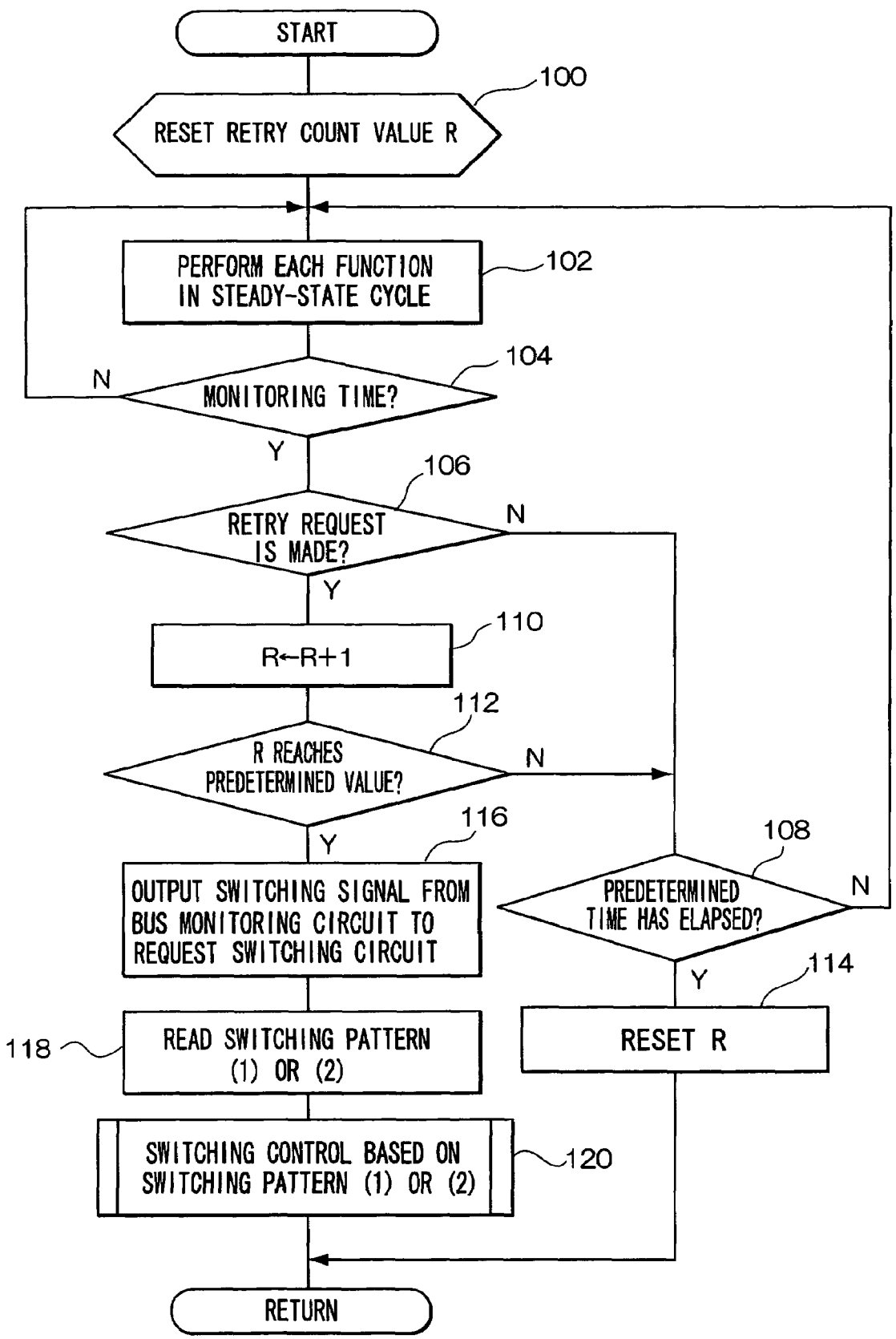
FIG. 4 is a flowchart showing a switching control in the data transfer control circuit according to the exemplary embodiment.

The operation of the exemplary embodiment will be described with reference to a flowchart shown in FIG. 4.

A retry count value R is reset (R=0) in Step 100, and each function is executed in the steady state cycle (see FIG. 3A) in Step 102.

In Step 104, it is judged whether or not it comes to the monitoring time. When the negative judgment is made in Step 104, the flow returns to Step 102.

When the affirmative judgment is made in Step 104, the flow goes to Step 106, and it is judged whether or not the retry request is made.

When the negative judgment is made in Step 106, the flow goes to Step 108, and it is judged whether or not the predetermined time has elapsed.

When the affirmative judgment is made in Step 106, the R value is incremented in order to count the number of times of the retry request in Step 110, and the flow goes to Step 112. In Step 112, it is judged whether or not the count value reaches the predetermined value previously set.

When the negative judgment is made in Step 112, the flow goes to Step 108, and it is judged whether or not the predetermined time has elapsed.

When the negative judgment is made in Step 108, namely when the predetermined time has not elapsed, the flow returns to Step 102, and the above steps are repeated.

When the affirmative judgment is made in Step 108, it is judged that the waiting time long enough to cause the generation of the deadlock has not elapsed, and the retry count value R is reset in Step 114. Then the routine is ended.

When the affirmative judgment is made in Step 112, it is judged that the dead lock is possibly generated, the flow goes to Step 116, and the bus monitoring circuit 26 outputs the switching signal to the request switching circuit 28.

Figure 3C:
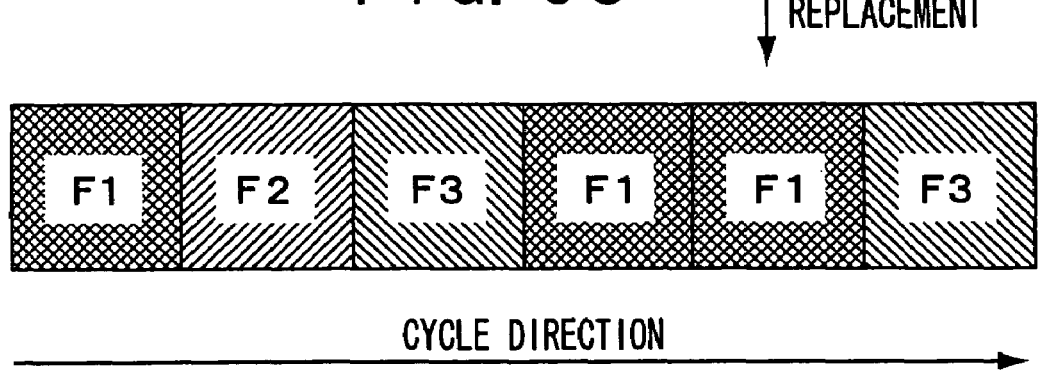

In Step 118, the switching pattern (1) or the switching pattern (2), i.e., FIG. 3B or 3C is read due to the switching signal, and the flow goes to Step 120. The one kind of switching pattern may be used, or the switching pattern to be read may be changed in a step manner according to a frequency of the retry.

In Step 120, the switching control is executed by the read switching pattern (1) or (2). Therefore, because the function different from the function recognized by the internal bus arbiter 24 is executed, the deadlock caused by the continuous retries can be prevented.

Thus, in the exemplary embodiment of the invention, when the plural bus masters are connected to the bus 12, the deadlock generated in simultaneously making the requests of the use right of the bus 12 is prevented by switching the functions on the bus master side. In this case, the functions of the internal bus arbiter 24 incorporated into the bus master is not changed, and only the request switching circuit 28 is arranged between the internal bus arbiter 24 and each function. Therefore, the deadlock can be prevented with simple circuit configuration. Furthermore, the internal bus arbiter 24 does not recognize that the functions are switched. Therefore, it is not necessary to largely change the control program and the like.

In the exemplary embodiment, the request switching circuit 28 is provided between the internal bus arbiter 24 and each of the functions (Func. 1, Func. 2, . . . , and Func. N). The function of the request switching circuit 28 may be added to the internal bus arbiter 24 (see FIG. 5).

Figure 5:
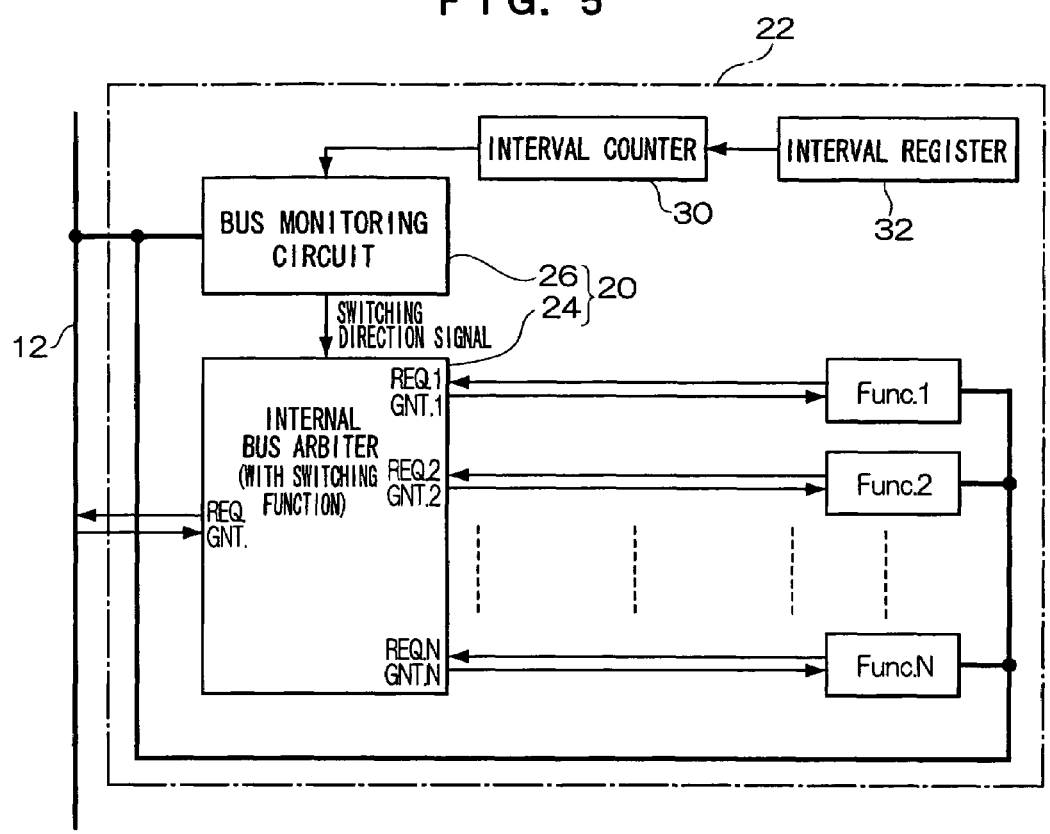
FIG. 5 is a block diagram showing a data transfer control circuit in a bus master according to a modification.

In this case, it is necessary to change the already-existing internal bus arbiter 24, while the already-existing data transfer control system can be used as it is in the above mentioned exemplary embodiment. However, because the device configuration can be simplified, the configuration shown in FIG. 5 is effectively used when newly manufactured. In the configuration shown in FIG. 5, because the internal bus arbiter 24 executes the function of the request switching circuit 28 as shown in FIG. 2, the deadlock monitoring unit 20 is formed by the bus monitoring unit 26 and the internal bus arbiter 24.

What is claimed is:

1. A data transfer control device that carries out data transfer in a data transfer system, in which a plurality of bus masters are connected to a system bus and the data transfer between the bus masters is arbitrated by bus arbitration of each of the bus masters, between the bus masters, the data transfer control device comprising:
   an execution cycle monitoring section that monitors an access state for the system bus at the bus master when a plurality of bus masters simultaneously request a use right with respect to the system bus; and
   a function execution order changing control section that changes an execution order of a plurality of functions included in the bus master to be monitored, based on the access state monitored by the execution cycle monitoring section.

2. The data transfer control device of claim 1, wherein the execution cycle monitoring section monitors a number of times of retrying executed when the use right with respect to the system bus cannot be obtained.

3. The data transfer control device of claim 1, wherein:
   the bus master is provided with an internal bus arbiter that arbitrates the execution order of the plurality of functions, and
   the function execution order changing control section is a switching section which is provided between the internal bus arbiter and each of the functions, and which switches a function assigned by the internal bus arbiter to another function, based on a switching instruction signal from the execution cycle monitoring section when the access state monitored by the execution cycle monitoring section becomes a predetermined state.

4. The data transfer control device of claim 2, wherein:
   the bus master is provided with an internal bus arbiter that arbitrates the execution order of the plurality of functions, and
   the function execution order changing control section is a switching section which is provided between the internal bus arbiter and each of the functions, and which switches a function assigned by the internal bus arbiter to another function, based on a switching instruction signal from the execution cycle monitoring section when the number of times of retrying monitored by the execution cycle monitoring section is equal to or more than a predetermined number.

5. The data transfer control device of claim 3, wherein the function switching which is performed by the switching section is changing of the execution order of at least two functions among the plurality of functions.

6. The data transfer control device of claim 3, wherein:

first terminals respectively connected to the plurality of the functions, and second terminals connected to the internal bus arbiter and correspondingly connected to the respective first terminals, are provided at the switching section; and connection relationships between the first terminals and the second terminals are changed when the access state monitored by the execution cycle monitoring section becomes the predetermined state.

7. The data transfer control device of claim 4, wherein the switching instruction signal is outputted to the switching section when the number of times of retrying is equal to or more than the predetermined number in a predetermined period.

8. The data transfer control device of claim 4, wherein the function switching which is performed by the switching section is replacing the function which has been retried with another function.

9. The data transfer control device of claim 4, wherein:

first terminals respectively connected to the plurality of the functions, and second terminals connected to the internal bus arbiter and correspondingly connected to the respective first terminals, are provided at the switching section; and connection relationships between the first terminals and the second terminals are changed when the number of times of retrying monitored by the execution cycle monitoring section is equal to or more than the predetermined number.

10. The data transfer control device of claim 7, wherein the function switching which is performed by the switching section is changing of the execution order of at least two functions among the plurality of functions.

11. The data transfer control device of claim 7, wherein the function switching which is performed by the switching section is replacing the function which has been retried with another function.

12. The data transfer control device of claim 10, wherein the switching section includes a plurality of patterns for function switching, and the pattern is selected based on the number of times of retrying.

13. The data transfer control device of claim 8, wherein the switching section includes a plurality of patterns for function switching, and the pattern is selected based on the number of times of retrying.

* * * * *